Figure 1:
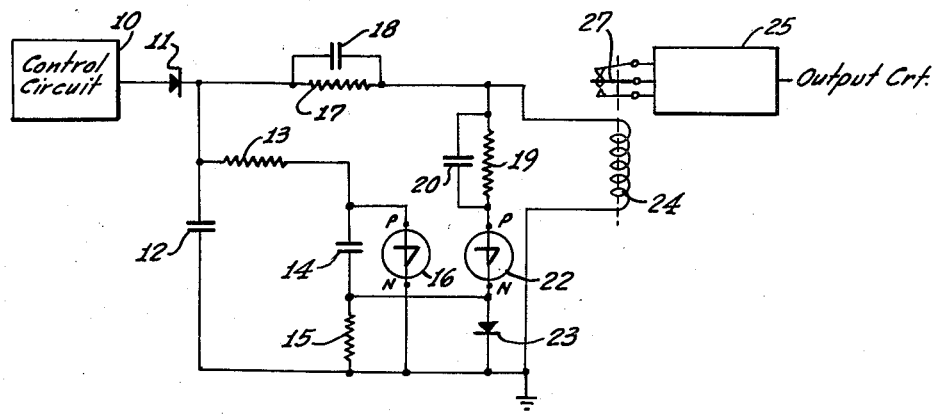

Nov. 5, 1963

H. T. WINCHEL 3,109,965

TIMING CIRCUIT

Filed Nov. 24, 1959

INVENTOR:
Henry T. Winchel

By Smyth & Roston
Attorneys,

United States Patent Office
3,109,965
Patented Nov. 5, 1963

3,109,965
TIMING CIRCUIT
Henry T. Winchel, Culver City, Calif., assignor to Consolidated Electronics Industries Corp., New York, N.Y., a corporation of Delaware
Filed Nov. 24, 1959, Ser. No. 855,172
8 Claims. (Cl. 317—148.5)

This invention relates to timing circuitry and, more particularly, to electronic circuitry for indicating with precision a particular period of time. The invention is especially concerned with electronic circuitry for indicating a particular period during which voltage is applied from a source and for operating a relay during the particular period.

In many applications, it is desirable or even necessary to measure a period of time with considerable degree of precision. For example, it may be desired in an industrial process to introduce precise amounts of a number of different materials to a mixing chamber so that a product with optimum property is obtained. In order to provide the proper amount of each material in the mixture, it may be necessary to precisely control the duration during which each material is introduced to the mixture.

This invention provides a circuit which measures the duration that voltage is applied from an input circuit. A relay is operated to indicate the initiation of the duration of voltage application, and the relay is released to provide an indication of the termination of a particular timing interval during which the voltage is applied. The relay is accordingly operated only during a particular timing interval following the application of the voltage. In one specific illustrative embodiment of this invention, the input voltage is applied to a capacitive circuit arrangement and to a series circuit including a relay winding. The relay operates to provide an indication of the initiation of the timing interval. The capacitive arrangement controls the condition of a two-terminal control member which is bistable in that it has two stable impedance conditions. In the illustrative embodiment, the timing circuit includes two such control members with the second being connected as part of a shunt circuit across the relay winding.

The first control member is operated from its higher impedance condition to its lower impedance condition by the capacitive arrangement a predetermined interval after the application of the input voltage. When the first control member is operated, it discharges a capacitor in the capacitive arrangement to provide a biasing potential for operating the seond control member to its lower impedance condition. When the second control member operates, it effectively short-circuits the relay winding to provide an indication of the termination of the control interval.

The shunt circuit across the relay winding includes an asymmetrically conducting impedance element which is reverse-biased when the first control member operates to isolate the second control member and permit the potential across it to reach its operating or breakdown potential.

Figure 2:
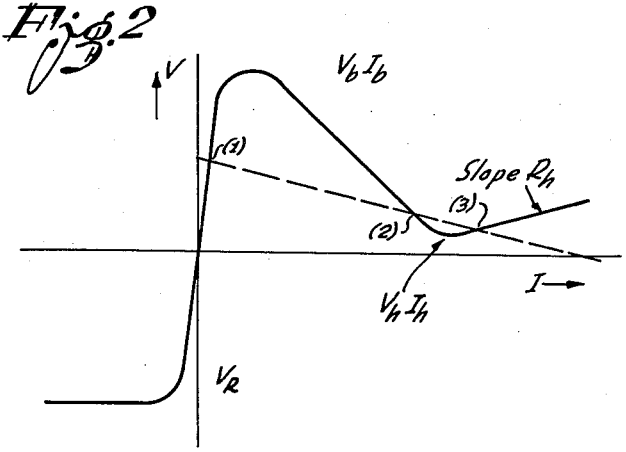

Further advantages and features of this invention will become apparent upon consideration of the following description when read in conjunction with the drawing, wherein:

FIGURE 1 is a circuit representation of an electronic timing circuit constituting the illustrative embodiment of this invention; and FIGURE 2 is a graph illustrating the current voltage characteristic of the four layer diodes utilized in the timing circuit of this invention.

In the embodiment of the invention illustrated in FIGURE 1, power is applied from a control circuit 10 to energize a relay winding 24. The energizing power for the relay winding 24 is from the control circuit 10 through a diode 11 and a resistor 17, which is shunted by a capacitor 18, to one terminal of the relay winding 24. The other terminal of the relay winding 24 is grounded. The resistor 17 and the capacitor 18 may have suitable values such as 10 kilohms and 6 microfarads, respectively, and the impedance presented by the relay winding 24 to direct currents may be 10 kilohms. The control circuit 10 may provide a potential having a magnitude of 25 volts and the operating characteristics of the relay may be such as to provide for its operation when a potential of the 10 volts is applied across the relay winding 24.

The relay winding 24 is magnetically coupled to a movable switch, or armature 27, which is normally positioned adjacent an associated upper contact and which is moved when the relay is operated to a position contacting an associated lower contact. The switch 27 is, therefore, a transfer switch which changes connections provided to an output circuit 25 when the relay winding 24 is energized by the control circuit 10. Due to the voltage divider effect of the resistor 17 in conjunction with the winding 24, approximately one-half of the control voltage from the circuit 10 appears across the winding 24. As indicated above, the control potential may be 25 volts so that a potential of 12½ volts appears across the winding 24 and the relay operates. The capacitor 18 functions to short-circuit the resistor 17 during the transient condition when power is applied by the control circuit 10 to provide for the rapid operation of the relay.

As described above, the operating path for the relay winding 24 includes the diode 11. The cathode of the diode 11 is coupled to ground by a filter capacitor 12 which shunts relatively high frequency variations of the input control potential to ground. The capacitor 12 may have a suitable value such as 20 microfarads. The relay winding 24 remains energized and the switch 27 remains in its operative condition for a predetermined interval after the application of power from the control circuit 10. The operating duration of the relay, which illustratively may be 30 seconds, is controlled by a capacitive circuit arrangement and two control members 16 and 22 which are hereinafter described.

The capacitive circuit arrangement includes a resistor 13 and a capacitor 14 which are serially connected with a resistor 15 between the cathode of the diode 11 and a ground connection. The resistors 13 and 15 may have suitable values such as 1 megohm each and the capacitor 14 may have a suitable value such as 30 microfarads. The time constant of the circuit arrangement, including the resistor 13 and the capacitor 14 is, accordingly, 30 seconds. When power is applied from the control circuit 10, the capacitor 14 accordingly is charged through the resistor 13. The resistor 15 is effectively shunted by a diode 23 during the time that the capacitor 14 is being charged from the control circuit 10. The diode 23, which may be conventional, may illustratively be of the type 1N461 manufactured by the Hughes Aircraft Company. The diode 11 which, as described above, is part of the operating path for the relay winding 24, may be similar to the diode 23.

The junction between the resistor 13 and the capacitor 14 is connected to a terminal P of the two-terminal control member 16 which was briefly mentioned above. The other terminal N of the control member 16 is connected to the common ground connection. The control member 16 is, as indicated above, one of two similar control members 16 and 18 included as part of the timing circuit for controlling the duration of the operation of the relay.

The control members 16 and 22 may be four layer semiconductor diodes of the type described by William Shockley in an article on the Unique Properties of a 4-Layer Diode which was published in the Electronics Industries magazine of August 1957. Briefly, the four layer diode is a two terminal device having two operating conditions: an open or low conductance state corresponding to approximately 100 megohms; or a closed or high conductive state corresponding to approximately 3 ohms. When the voltage across the control member 16 or the control member 22 exceeds a predetermined breakdown potential in the direction indicated by the slanted line in the symbol for the control member, the control member assumes its low impedance condition. The breakdown potential may illustratively be 20 volts and the control members 16 and 22 may be of the type 4N20D manufactured by the Shockley Semi-Conductor Laboratories. FIGURE 2 illustrates a typical load line for the 4-layer diodes 16 and 22. The two outer intersections (1) and (3) are stable and the middle intersection (2) is unstable. When the breakdown potential is exceeded, the condition of the four layer diode is changed from that indicated by intersection (1) to that indicated by intersection (3). As indicated by the curve in FIGURE 2, the slope of the current voltage characteristic is considerably smaller at the intersection (3) than at the intersection (1). The impedance presented at these two conditions is, therefore, quite different with the impedance at the intersection (3) being quite smaller.

With the breakdown potential of the control member 16 being 20 volts, the control member 16 does not assume its low impedance condition until the capacitor 14 charges to the potential of 20 volts. When, after an interval determined by the time constant of the capacitive arrangement, the potential across the control member 16 exceeds 20 volts, the control member breaks down assuming its low impedance condition and establishing a discharge path for the capacitor 14. The capacitor 14 accordingly discharges over a path through the control member 16 to the ground connection. The discharge path is completed from the ground connection through the resistor 15 back to the capacitor 14. With current flowing through the resistor 15 to the capacitor 14, the junction between the resistor 15 and the capacitor 14 becomes negative to reverse bias the diode 23. As described above, the diode 23 is included in the charging path for the capacitor 14 being connected from one plate of the capacitor 14 to the ground connection.

The diode 23 is also included as part of a shunting path through the second control member 22. The control member 22 and the diode 23 are serially connected with a parallel circuit arrangement between the upper terminal of the winding 24 and the common ground connection. The parallel circuit arrangement includes a resistor 19 and a shunting capacitor 20 having suitable values such as 5 kilohms and 6 microfarads respectively. Before the operation of the control member 16, the potential across the control member 22 is approximately one-half of the input control potential due to the voltage divider effect of the resistor 17 and the relay winding 24. The potential, therefore, at the terminal P of the control member 22 is at 12½ volts during the time that the capacitor 14 is being charged. When, however, the control member 16 breaks down, a negative potential is developed at terminal N of the control member 22 due to the discharge current for the capacitor 14 through the resistor 15. The negative potential at terminal N of the control 22 reverse biases the diode 23 to effectively isolate the control member 22 from the ground connection to permit the potential across it to reach its breakdown potential. The control member 22 accordingly breaks down. The capacitor 20 provides for a low impedance shunting path about the resistor 19 during the transient breakdown interval of the control member 22. The resistor 19 limits the current through the control member 22 after it assumes its low impedance condition.

When the control member 22 breaks down, it establishes a shunting path for the relay winding 24 causing it to de-energize and return the switch 27 to its normal position adjacent its upper contact. When the control member 22 breaks down, it also halts the discharge of the capacitor 14 by increasing its potential at its terminal N. The control members 16 and 22 remain in their low impedance condition as long as power is applied from the control circuit 10 and the relay winding 24 remains de-energized. When the capacitive discharge current for the capacitor 14 halts, the diode 23 is forward biased to shunt the resistor 15. The total impedance in the shunting path becomes accordingly that of the resistor 19 which is 5 kilohms. With the shunting path impedance at 5 kilohms, the potential across the winding 24 reduces to only approximately 6.2 volts. The 6.2 volt potential is sufficient to maintain the control member 22 in its low impedance condition but it is insufficient to maintain the operation of the relay.

When power is interrupted in the control circuit 10, the control members 16 and 22 return to their high impedance condition to ready the timing circuit for another sequence of operations described above. In the sequence of operations described above, power is applied from the control circuit 10 to first operate the relay and then to de-energize it or return it to normal after a predetermined interval. The timing circuit may also be utilized with the control circuit 10 providing a normal operating potential for the relay winding 24 and an operative control potential for de-energizing it. In this modification, the operating characteristics of the relay may be such as to provide for the operation of a switch 27 when a potential somewhat less than 10 volts is applied across the relay winding 24, for example, at 8 volts. The normal potential provided from the control circuit 10 is sufficient to operate the relay but is insufficient to break down either of the two control members 16 and 22. If, however, the potential provided from the control circuit 10 increases to a predetermined magnitude for a predetermined interval, the control member 16 breaks down to initiate the de-energizing sequence described above. For the particular illustrative circuit parameters, given above, the relay winding 24 is de-energized after a relatively brief interval because the capacitor 14 is partially charged by the normally applied operating potential from the control circuit 10. The circuit parameters, however, can be varied to provide for larger or smaller timing intervals.

When the potential returns to its original normal condition, both control members 16 and 22 also return to their original high impedance conditions. The circuit parameters of the various components coupled respectively to the control members 16 and 22 may be at values which restrict the current through the members to magnitudes below the sustaining currents when the normal potential is applied.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A timing circuit for operating a relay for a particular interval after the application of an energized potential to the timing circuit, including, a capacitive circuit arrangement for receiving the energizing potential, a bistable device having high and low impedance conditions and coupled to said capacitive arrangement and operated by said arrangement after the particular interval from its high impedance condition to its low impedance condition, output means connected to said capacitive arrangement and responsive to the energizing potential to become energized for indicating the initiation of the particular interval, a control member having a normally high impedance condition and an operative low impedance condition and responsive to the potential across said output means to remain in the high impedance condition and responsive to a particular voltage greater than the voltage across the output means to become operative in the low impedance condition, means connected in a circuit with the control member across the output means for obtaining a de-energizing of the output means upon the production of the low impedance condition in the control member, and means connected in a circuit with the capacitive circuit arrangement and operatively coupled to the bistable device to produce a voltage upon the operation of the bistable device to the low impedance condition and connected in a circuit with the control member across the output means to provide a co-operation with the energizing potential in obtaining the production of the particular voltage across the control member and the production of the low impedance condition in the control member for an interruption in the energizing of the output means.

2. A timing circuit, including, output means for providing an output indication; a source of potential greater than a particular value to initiate the operation of the timing circuit; an impedance connecting said output means to said source to obtain the application of a potential less than the particular value from said source; first and second control members each having a normally high impedance condition and an operative low impedance condition, and each being normally operative in the high impedance condition and being responsive to a particular potential to become operative in the low impedance condition, shunting means connected in a circuit with said second control member across said output means to maintain said second control member in the high impedance condition during the energizing of the output means and to co-operate with the second control member in providing for a de-energizing of the output means upon the occurrence of the low impedance condition in the second control member, and a capacitive circuit arrangement coupled to said source and to said first and to said second control members and said shunting means for receiving a charge from the potential from the source and for applying the particular potential to the first control member upon the occurrence of a particular charge in the capacitive circuit and for applying a potential to the second control member and the shunting means upon the occurrence of the low impedance condition in the first control member to obtain the production of the particular potential across the second control member.

3. A timing circuit, including, an output device having operative and inoperative states, a source of potential connected to said output device for initiating the operation of said output device, a shunting circuit arrangement coupled across said output device and including a first transistor device, said first transistor device having a high impedance condition and having an operative low impedance condition for bringing said output device to the inoperative state upon the occurrence of the low impedance condition in the transistor device and responsive to a particular potential greater than the potential across the output device for assuming the low impedance condition, a second transistor device having a high impedance condition and an operative low impedance condition and responsive to the particular potential for assuming the low impedance condition, a capacitive circuit arrangement coupled to said source and to said second transistor device to receive a charge from the source and effective upon the occurrence of a particular charge in the capacitive circuit arrangement after a particular interval from the initiation of the operative state of said output device for changing the condition of said second transistor device from its normal high impedance condition to the low impedance condition, and means coupled to said capacitive circuit arrangement and to the first transistor device and responsive to the change in the second transistor device from the high impedance condition to the low impedance condition for introducing a potential to the second transistor device for producing the particular potential across the second transistor device.

4. A timing circuit, including, a relay having a winding and having at least one armature magnetically coupled to said winding; a source of potential for applying a control potential to the relay winding to initiate the energizing of the relay, an impedance connecting said relay winding to said source to obtain the introduction of the control potential from said source to said relay winding, first and second transistor control members each having a normally high impedance condition and an operative low impedance condition and each responsive to a particular potential greater than the control potential to become converted to the low impedance condition, a shunting circuit coupled across said winding of said relay and including said second transistor control member and further including an asymmetrically conducting impedance element serially connected with said second transistor control member to provide a low impedance in the direction of energizing the relay and to provide a high impedance in a direction opposite to the direction of energizing the relay, a capacitive circuit arrangement coupled to said source and to said first transistor control member for receiving a charge from said source and for introducing the particular potential to said first transistor control member upon the occurrence of a particular charge in the capacitive circuit arrangement after a particular interval from the application of said control potential from said source and for obtaining a discharge of the charge in the capacitive circuit arrangement through the first transistor control member upon the occurrence of the low impedance in the transistor control member, and means connecting said capacitive circuit arrangement to said second transistor control member and to said asymmetrically conducting impedance element in the low impedance condition of said first transistor control member to obtain the production of the particular potential across the second transistor control member upon the discharge of the charge in the capacitive circuit arrangement through the first transistor control member.

5. A timing circuit in accordance with claim 4 wherein said last mentioned means are connected to said second transistor control member and to said asymmetrically conducting impedance element to reverse bias said asymmetrically conducting impedance element for the production of the particular potential across said second transistor control member.

6. A timing circuit, including, an output device having operative and inoperative states, a source of potential connected to said output device for initiating the operation of said output device in the operative state, a shunting circuit arrangement coupled across said output device and including a first transistor device having a normal high impedance condition and an operative low impedance condition for returning said output device to the inoperative state in the low impedance condition, said transistor device being responsive to a particular potential greater than the potential across the output device in the operative state of the output device for assuming the low impedance condition, a second transistor device having a normal high impedance condition and an operative low impedance condition and being responsive to the particular potential for assuming the low impedance condition, a capacitive circuit arrangement including a resistor and including a capacitance connected across the second transistor device and connected to the source of potential to produce a charging of the capacitance and to obtain the introduction of the particular potential to the second transistor device upon the occurrence of a particular charge across the capacitance for a discharge of the capacitance through the second transistor device and the resistor, and means connected in the shunting circuit with the first transistor device and connected to the capacitor and the resistor for introducing a potential to the first transistor device during the discharge of the capacitor through the second transistor device to obtain the production of the particular potential across the second transistor device in combination with the potential produced in the shunting circuit from the source.

7. The timing circuit set forth in claim 6 wherein the means connected in the shunting circuit with the first transistor device is an asymmetrically conducting impedance element in series with the first transistor device and wherein the asymmetrically conducting impedance element has a low impedance in the direction of the flow of current from the source through the shunting circuit and has a high impedance in the opposite direction and wherein the common terminal between the resistor and the capacitor is connected to the common terminal between the first transistor device and the asymmetrically conducting impedance element in the shunting circuit.

8. The timing circuit set forth in claim 7 in which the asymmetrically conducting impedance element is a diode and in which the output device is a relay and in which switching means are included in the relay and in which an output circuit is connected to the switching means for control by the switching means in accordance with the energizing of the relay.

References Cited in the file of this patent

UNITED STATES PATENTS

| | | |
|---|---|---|
| 2,773,221 | Shaw | Dec. 4, 1956 |
| 2,785,346 | Large | Mar. 12, 1957 |
| 2,835,849 | Biedermann et al. | May 20, 1958 |
| 2,845,548 | Sillman et al. | July 29, 1958 |
| 2,892,101 | Bright | June 23, 1959 |

FOREIGN PATENTS

| | | |
|---|---|---|
| 1,061,443 | Germany | July 16, 1953 |